US 6,534,947 B2

(12) United States Patent
Johnson et al.

(10) Patent No.: US 6,534,947 B2
(45) Date of Patent: Mar. 18, 2003

(54) PUMP CONTROLLER (75) Inventors: Steven A. Johnson, Hartland, WI (US);
Kip M. Larson, Rapid City, SD (US);
Dee R. Walker, Rapid City, SD (US)

(73) Assignee: Sta-Rite Industries, Inc., Delavan, WI (US)

( * ) Notice: Subject to any disclaimer, the term of this patent is extended or adjusted under 35 U.S.C. 154(b) by 138 days.

(21) Appl. No.: 09/760,276

(22) Filed: Jan. 12, 2001

(65) Prior Publication Data
US 2002/0093306 A1 Jul. 18, 2002

(51) Int. Cl.[7] ............................ H02H 5/04; H02H 7/08; H02P 1/26; H02P 1/42; H02P 5/28
(52) U.S. Cl. .................... 318/782; 318/62; 318/103; 318/453; 361/2; 361/23; 361/28
(58) Field of Search ............................ 318/782, 789, 318/103, 62, 452, 453, 454, 455, 484; 361/23, 28, 30, 2, 3; 417/12, 43

(56) References Cited

U.S. PATENT DOCUMENTS

| 3,283,236 A | 11/1966 | Legg |
| 3,352,246 A | 11/1967 | Inoue |
| 3,717,420 A | 2/1973 | Rachocki |
| 3,761,792 A | * 9/1973 | Whitney et al. ............. 318/788 |
| 3,776,661 A | 12/1973 | Wohnich |
| 3,858,102 A | 12/1974 | Quinn |
| 3,953,777 A | 4/1976 | McKee |
| 4,021,700 A | 5/1977 | Ellis-Anwyl |
| 4,195,968 A | 4/1980 | Emeny |
| 4,241,299 A | 12/1980 | Bertone |
| 4,311,438 A | 1/1982 | Comstedt |
| 4,396,353 A | 8/1983 | MacDonald |
| 4,412,162 A | 10/1983 | Kitamura |
| 4,420,787 A | 12/1983 | Tibbits et al. |
| 4,421,643 A | 12/1983 | Frederick |
| 4,437,811 A | 3/1984 | Iwata et al. |
| 4,473,338 A | 9/1984 | Garmong |
| 4,505,643 A | 3/1985 | Millis et al. |
| 4,507,053 A | 3/1985 | Frizzell |
| 4,715,785 A | 12/1987 | Gurega |
| 4,752,188 A | 6/1988 | Gurega |
| 4,841,404 A | * 6/1989 | Marshall et al. ............. 318/455 |
| 4,864,157 A | * 9/1989 | Dickey ............................ 361/3 |
| 4,912,390 A | * 3/1990 | Curran et al. ................. 318/729 |
| 5,076,763 A | 12/1991 | Anastos et al. |

(List continued on next page.)

FOREIGN PATENT DOCUMENTS

| CN | TI 75201205 | 6/1975 |
| CN | TI 77209474 | 10/1977 |
| CN | TI 77209604 | 10/1977 |
| CN | TI 78375 | 6/1986 |

Primary Examiner—Robert E. Nappi
Assistant Examiner—Edgardo San Martin
(74) Attorney, Agent, or Firm—Michael Best & Friedrich LLP (57) ABSTRACT A method and apparatus for controlling an electric motor pump. The method includes the acts of providing an AC power signal having a positive half cycle and a negative half cycle, measuring the voltage of the AC power signal and generating a first two-state output signal that is in a logic high state when the measured voltage is on the positive half cycle and that is in a logic low state when the measured voltage is on the negative half cycle, and measuring the current of the AC power signal and generating a second two-state output signal that is in logic high state when the measured current is on the positive half cycle and that is in a logic low state when the measured current is on the negative half cycle. The method also includes determining a time difference between the first and second two-state output signals, calculating a phase difference based on the time difference, comparing the phase difference to a predetermined threshold value, opening a switch if the determined phase difference is equal to or greater that the predetermined threshold value, and, after the switch is opened, closing the switch after a predetermined amount of time has elapsed.

37 Claims, 6 Drawing Sheets

U.S. PATENT DOCUMENTS

| | | |
|---|---|---|
| 5,145,323 A | 9/1992 | Farr |
| 5,238,369 A | 8/1993 | Farr |
| 5,324,170 A | 6/1994 | Anastos et al. |
| 5,361,184 A * | 11/1994 | El-Sharkawi et al. ........... 361/2 |
| 5,362,206 A * | 11/1994 | Westerman et al. ........... 417/12 |
| 5,549,456 A | 8/1996 | Burrill et al. |
| 5,577,890 A | 11/1996 | Nielsen et al. |
| 5,597,477 A | 1/1997 | Harry, III |
| 5,672,050 A | 9/1997 | Webber et al. |
| 5,826,374 A | 10/1998 | Baca |
| 5,910,875 A * | 6/1999 | Tian et al. ..................... 361/1 |
| 6,048,177 A | 4/2000 | Erkkilae et al. |

\* cited by examiner

PUMP CONTROLLER

BACKGROUND OF THE INVENTION

The present invention relates to methods and systems designed to control electric pumps. More specifically, the invention relates to a pump controller that measures a time difference between zero-cross inputs to control activation and deactivation of a pump.

Pumps for water and other liquids may be controlled in a variety of ways. The simplest and oldest method of controlling a pump is manual control, where an operator controls an on-off switch in response to the level of the liquid being pumped by the pump. Of course, manual control has several limitations, including the fact that in the absence of an operator the pump must either be left on, which often results in motor burnout or shortened motor life, or left off, which often results in liquid levels reaching unacceptable levels.

In response to these deficiencies, a number of automatic pumps and automatic pump controllers have been developed. Commonly, devices that sense the level of liquid, such as floats or sensors, are used to control a switch that when closed, connects the motor to a power supply, turning the motor on, and when open, disconnects the motor from the power supply, turning the motor off. While automatic devices such as these are an improvement over manual techniques, they are not completely satisfactory. Manual floats are often bulky and so are not useful in situations where pumps must be positioned in an area of limited space. Liquid level sensors must often be submersed or placed in close proximity to the liquid being pumped and are often corroded, fouled, or otherwise damaged by the environmental conditions. Accordingly, these types of pumps require a relatively high level of maintenance.

Because of these deficiencies, still other types of automatic pump control devices have been developed. Some pump protection devices exploit electrical phenomena that occur during the operation of an electric motor. When an electric-motor pump is initially turned on, the motor usually draws a relatively high-current signal. Thereafter, as the pump moves liquid, the motor current reaches a lower, relatively static level. If the pump encounters a "no-load" situation, that is, a situation where the liquid level has dropped to such an extent that no more liquid is being drawn into the pump, the current drawn by the pump decreases and the voltage level stays at substantially the same level that it reached while under load. Many presently available devices that exploit these phenomena are deficient because they rely on switching and/or SCR-control methodologies, which generate harmonics that can overheat and, thereby, shorten the life of an electric motor.

SUMMARY OF THE INVENTION

Accordingly, there is a need for an improved apparatus and method of controlling pumps. The present invention provides a method and an apparatus for protecting an electric motor pump based on the phase difference of two zero-cross signals. In one embodiment, the method includes measuring the voltage of an AC power signal that has a positive half cycle and negative half cycle. The measured voltage is used to generate a first two-state output signal that 1) is in a logic high state when the measured voltage is on the positive half cycle and 2) is in a logic low state when the measured voltage is on the negative half cycle. The method also involves measuring the current of the AC power signal and generating a second two-state output signal that 1) is in a logic high state when the measured current is on the positive half cycle and 2) is in a logic low state when the measured current is on the negative half cycle. Once the two output signals are generated, the phase difference between the first and second two-state output signals is determined. The difference is then compared to a predetermined threshold value. If the determined phase difference is equal to or greater than the predetermined threshold value, a switch controlling the motor of the pump is opened. The switch is closed after a predetermined amount of time has elapsed.

The invention may be implemented in an apparatus that includes, in one embodiment, a voltage filter capable of being coupled to an AC power source and of generating a first two-state output signal, a current filter capable of being coupled to an AC power source and of generating a second two-state output signal, a power supply circuit capable of producing a DC power signal, a programmable device coupled to the voltage filter, the current filter, and the power supply circuit and operable to produce a control signal based on the phase difference between the first and second two-state output signals, and a switch coupled to the programmable device and operable to open in response to the control signal.

As is apparent from the above, it is an advantage of the present invention to provide an apparatus and method of controlling an electric motor pump. Other features and advantages of the present invention will become apparent by consideration of the detailed description and accompanying drawings.

DETAILED DESCRIPTION

Before the invention is explained in detail, it is to be understood that the invention is not limited in its application to the details of the construction and the arrangements of the components set forth in the following description or illustrated in the drawings. The invention is capable of multiple embodiments and of being practiced or being carried out in various ways. Also, it is to be understood that the phraseology and terminology used herein is for the purpose of description and should not be regarded as limiting.

Figure 1:
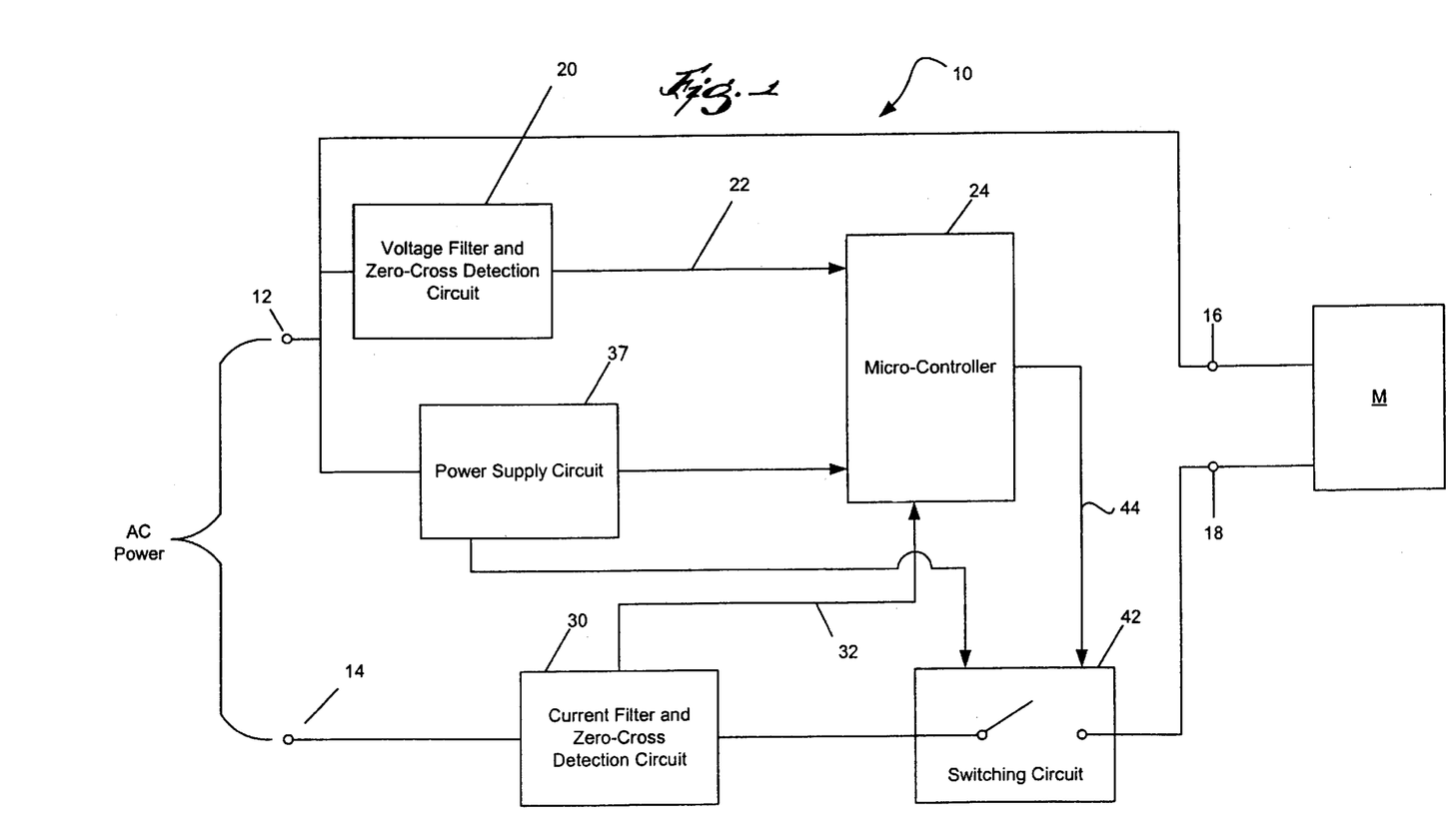
FIG. 1 is a schematic diagram of an apparatus embodying the invention.

A pump protection module or device 10 of one embodiment of the invention is shown in FIG. 1. The device 10 includes two input nodes 12 and 14. The input nodes 12 and 14 may be coupled to an AC power source such as a 120V, 60 Hz power outlet or similar power source. The device 10 also includes two output nodes 16 and 18. The output nodes 16 and 18 may be coupled to an AC motor M of a pump (not shown). As should be understood, the invention can be readily modified to work with a variety of AC power sources and the exact source used will, in most cases, depend on the power supply requirements of the motor M.

The device 10 includes a voltage filter and zero-cross detection circuit 20 that is coupled to the input node 12. The circuit 20 measures the voltage of the AC power signal from the node 12, filters the voltage signal, and converts the signal to a digital output signal. The circuit 20 sends its output signal via a link 22 to a controller 24 such as a programmable device, a microcontroller, or a hard-wired circuit. Preferably the controller 24 is programmable. The circuit 20 generates a binary digital or two-state output signal that 1) is in a logic high state when the AC voltage of the AC signal input to nodes 12 and 14 is on the positive half cycle and 2) is in a logic low state when the AC voltage of the AC signal is on the negative half cycle. The circuit 20 is shown in greater detail in FIG. 2.

Figure 2:
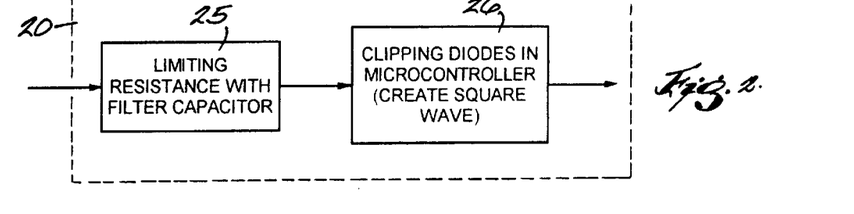
FIG. 2 is a schematic diagram of a voltage filter and zero-cross detection circuit of the invention.

The circuit 20 includes a filtering module 25 that includes a limiting resistor and filtering capacitor. The output of the filtering module 25 is delivered to square-wave module 26. In the embodiment shown, the square wave module includes a number of clipping diodes that shape the sinusoidal input signal to a square wave. The clipping diodes may reside in the controller 24.

Figure 3:
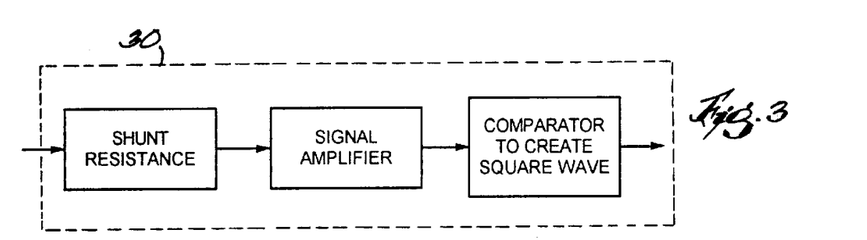
FIG. 3 is a schematic diagram of a current filter and zero-cross detection circuit of the invention.

Referring back to FIG. 1, the device 10 also includes a current filter and zero-cross detection circuit 30. The circuit 30 measures the current of the AC power signal from the node 14, filters the current signal, and converts the signal to a digital output signal. The circuit 30 sends its output signal via a link 32 to the microcontroller 24. Preferably, the circuit 30 generates a binary digital or two-state output signal that 1) is in a logic high state when the AC current of the AC signal input to nodes 12 and 14 is on the positive half cycle and 2) is in a logic low state when the AC current of the AC signal is on the negative half cycle. The circuit 30 is shown in greater detail in FIG. 3. The circuit 30 includes a shunt resistance 34, a signal amplifier 35, and a comparator 36. The shunt resistance provides a low voltage signal for the comparator. The comparator coverts the sinusoidal input signal into a square wave.

Figure 4:
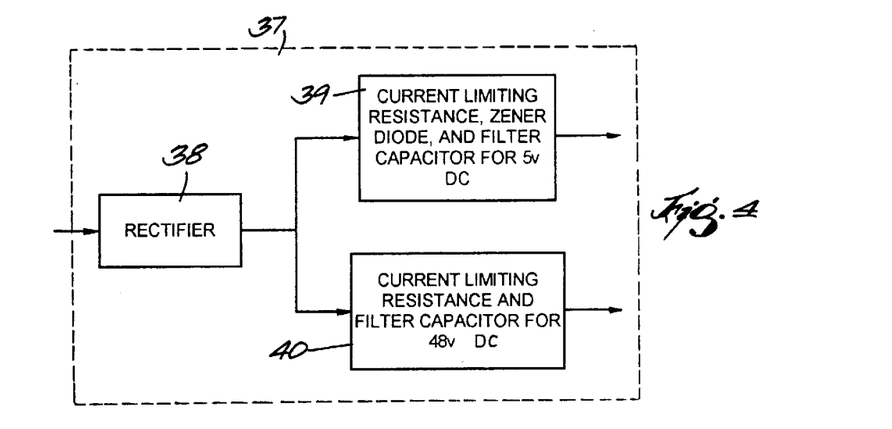
FIG. 4 is a schematic diagram of a power supply circuit of the invention.

The controller 24 is powered by a power supply circuit 37 (FIG. 1), which converts the AC power signal to a suitable DC signal. For most controllers suitable for use in the invention a DC voltage from about 5 to 14V is acceptable. As can be seen by reference to FIG. 4, the power supply circuit 37 includes a rectifier 38, and two current limiting and filter modules 39 and 40. The current limiting and filter module 39 is preferably designed to generate a 5 V DC output and the current limiting and filtering module 40 is preferably designed to generate a 48 V DC output. The 5 V DC output is supplied to the microcontroller 24 and the 48 V DC output is supplied to a switching circuit (discussed below).

Figure 5:
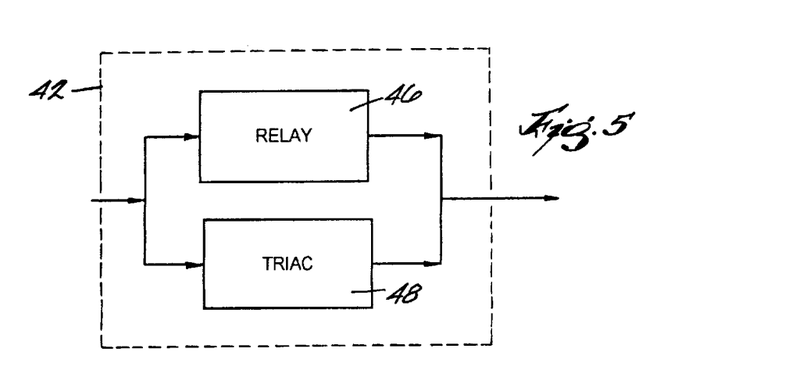
FIG. 5 is a schematic diagram of a switching circuit of the invention.

The controller 24 determines the phase difference between the output signal of the circuit 20 and the output signal of the circuit 30 and generates a first control signal based on the two signals. It should be understood that the controller 24 could generate a control signal of zero amplitude. Thus, the controller may control a device by supplying a control signal of a non-zero magnitude as well as by removing that signal, which could be described as supplying a zero magnitude signal. Output signals generated by the controller 24 are sent to a switching circuit or switch 42 over a link 44. The switch 42 may include a relay 46 and/or a semi-conductor device 48, such as a triac. Preferably, the switch is a normally-open switch.

In the embodiment where the switch 42 includes the semiconductor device 48 and the relay 46 in parallel, the relay 46 is used to open or close the motor circuit. In normal use, when a relay closes, an arc is drawn across its contacts. This is an expected phenomenon, and most relay contacts are made of a metal alloy that resists wear due to arcing. However, the contacts will wear down over time, and a most relays suitable for use in the invention will fail after approximately 100,000 cycles. The invention uses parallel switches to eliminate or reduce relay contact wear caused by arcing. Reducing wear in the relay enhances the overall life of the controller 24.

When the motor M is started, the semiconductor device 48 is turned on, before the relay 46 is closed. The semiconductor device 48 is turned on at a current zero crossing and no arc is drawn in the circuit. After a few milliseconds, the relay is turned on. The relay provides an alternate current path for the motor circuit, but no arcing occurs when the contacts close because there is no change in current flowing to the pump. After a few more milliseconds the semiconductor device is turned off and the relay maintains the current flow to the motor circuit.

To stop the pump, the semiconductor device is turned on. After a few milliseconds the relay is turned off. The semiconductor device provides the current path for the motor circuit for a few milliseconds, and then it is turned off. The semiconductor device is shut off at a current zero crossing, and no arcing occurs when the motor shuts off.

As noted above, the controller 24 can be programmable. In such an embodiment, when the controller 24 is powered up, it generates an output signal to the switch 42, thereby causing the switch to close. When the switch 42 closes and the device 10 is coupled to an AC power supply, an AC power supply signal is delivered to the nodes 16 and 18. The motor M is then energized, and will continue to operate so long as the switch 42 remains closed.

As the motor M operates, the circuits 20 and 30 continuously supply the controller 24 with information concerning the voltage supplied to and current drawn by the motor M. If the load on the motor decreases, the phase difference between the output signals of circuits 20 and 30 will increase. The controller may be preprogrammed with a predetermined phase difference threshold value. When the phase difference between the signals from the circuits 20 and 30 reaches or exceeds the threshold value, the controller 24 turns off or removes the control signal to the switch 42, causing the switch to open and the motor M to shut off. The threshold value may be determined empirically, by observing operation of the pump when a no-load condition or a break in suction occurs. At that time, the actual phase difference between the current and voltage signals of the circuits 20 and 30 can be measured and the threshold value can be set slightly below or above that value depending on the pumping action desired for the pumping application at hand. The controller 24 may be preprogrammed to tolerate a no-load condition for a predetermined amount of time, such as about 4 seconds, before shutting the motor M off. That is, the controller 24 may be programmed to wait a certain period of time before turning off or removing the control signal.

Figure 6:
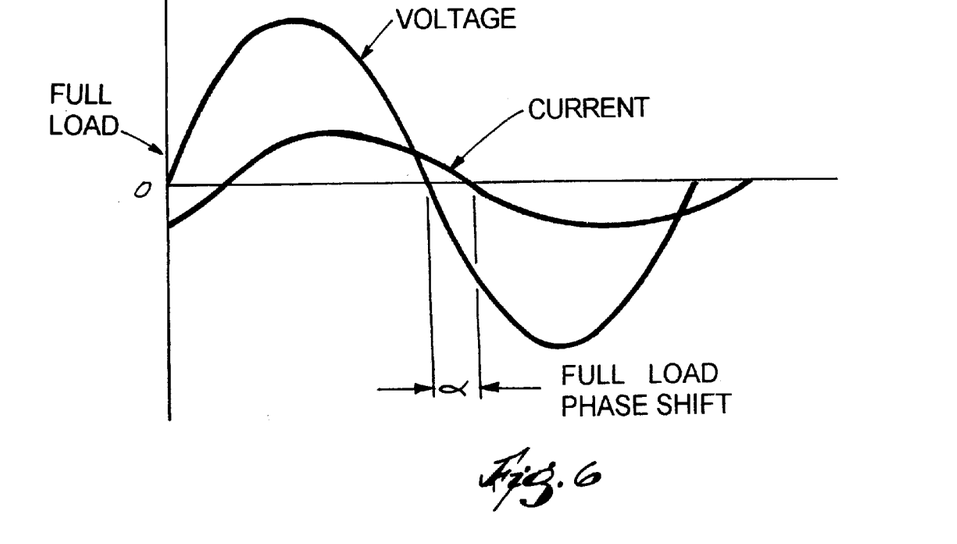
FIG. 6 is a signal trace of voltage and current signals from a pump motor under load.
Figure 7:
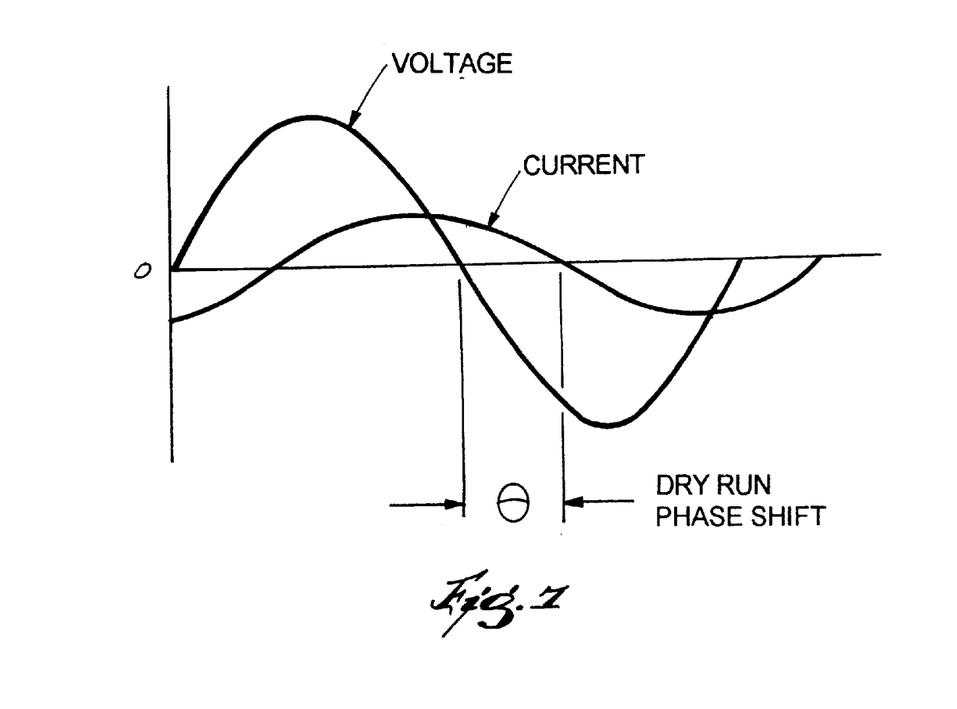
FIG. 7 is a signal trace of voltage and current signals from a pump motor under no load.
Figure 8:
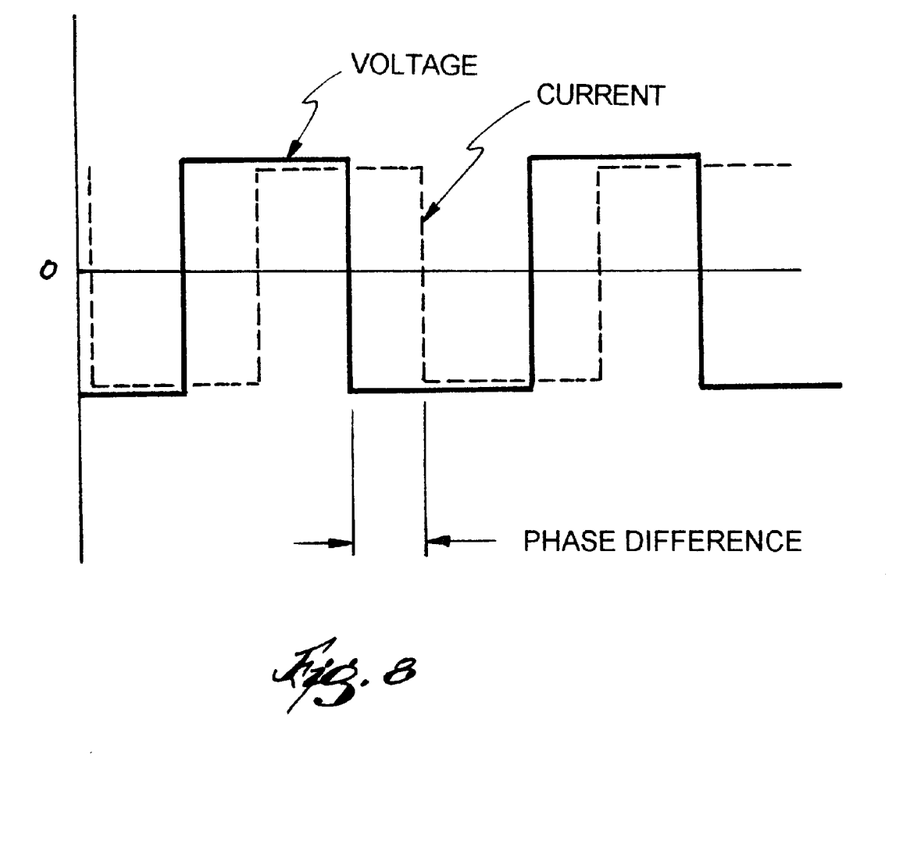
FIG. 8 is a signal trace of digital signals processed by a microprocessor of the invention.

The calculation of phase difference may be further understood by reference to FIGS. 6–8. FIG. 6 illustrates a signal trace of voltage and current levels measured in a pump motor under full load. As can be seen, the current lags the voltage by a phase difference α. Under no load, or when no liquid is pumped, the phase difference between the voltage and current increases to an amount θ (FIG. 7). As noted above, the controller receives digital signals and, thus, measures time differences in zero cross values as shown in FIG. 8.

In order to maintain automatic and continuous pumping operations, as may be required in many pumping applications, the microcontroller 24 may be programmed to wait a certain period of time after opening the switch 42, such as about three minutes, and then the controller 24 may close the switch 42 and repeat the monitoring of the phase difference between the output signals of the circuits 20 and 30. In this manner, the invention may be used to ensure that liquid is always pumped whenever the level of liquid is sufficient to create a suction condition for the pump.

Figure 9:
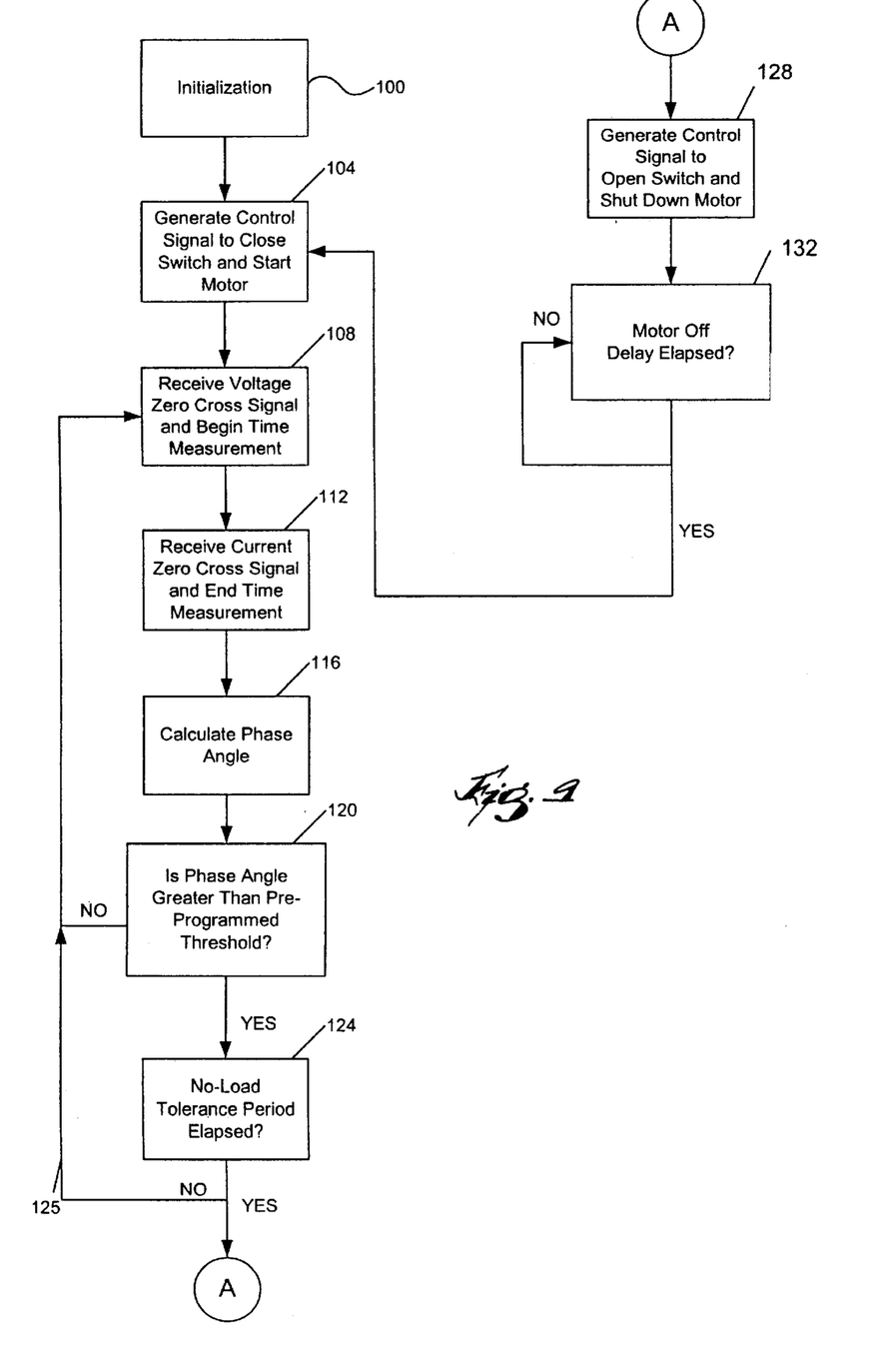
FIG. 9 is a flowchart of the software used in the invention.

The operation of the controller 24 may be further understood by reference to FIG. 9, which is a flowchart of software suitable for use in the invention and for being executed by the controller when it takes a programmable form. Once turned on, the controller 24 performs standard initialization functions, as shown at step 100. The controller 24 then generates a signal to close switch 42 and start the motor, as shown at step 104. The controller then reads or receives the voltage zero-cross signal from the circuit 20. The controller also begins measuring the time until the zero-cross signal from the circuit 30 is received. As shown at step 112, once the zero-cross current signal is generated by the circuit 30, it is received by the controller 24. The controller then ends the time measurement. The phase difference between the signals is calculated based on the amount of time measured, as shown at step 116. The controller 24 then determines whether the phase difference is greater than or equal to the predetermined threshold at step 120. If this criterion is not met, steps 108 through 120 are repeated. In other words, the pump will operate continuously so long as a suction condition exists. If the threshold is met or exceeded, the controller 24 then checks to see whether a no-load tolerance period has elapsed, as shown at step 124. If the no-load period has not elapsed, steps 108 through 120 are repeated, as shown by loop 125. Once the period lapses, the controller generates a control signal to open the switch 42, as shown at step 128. The controller then waits, as shown at step 132, for a predetermined delay time, which might be set according to the expected liquid flow rate into the area being evacuated by the pump. The entire process is then repeated by returning to step 104.

Figure 10:
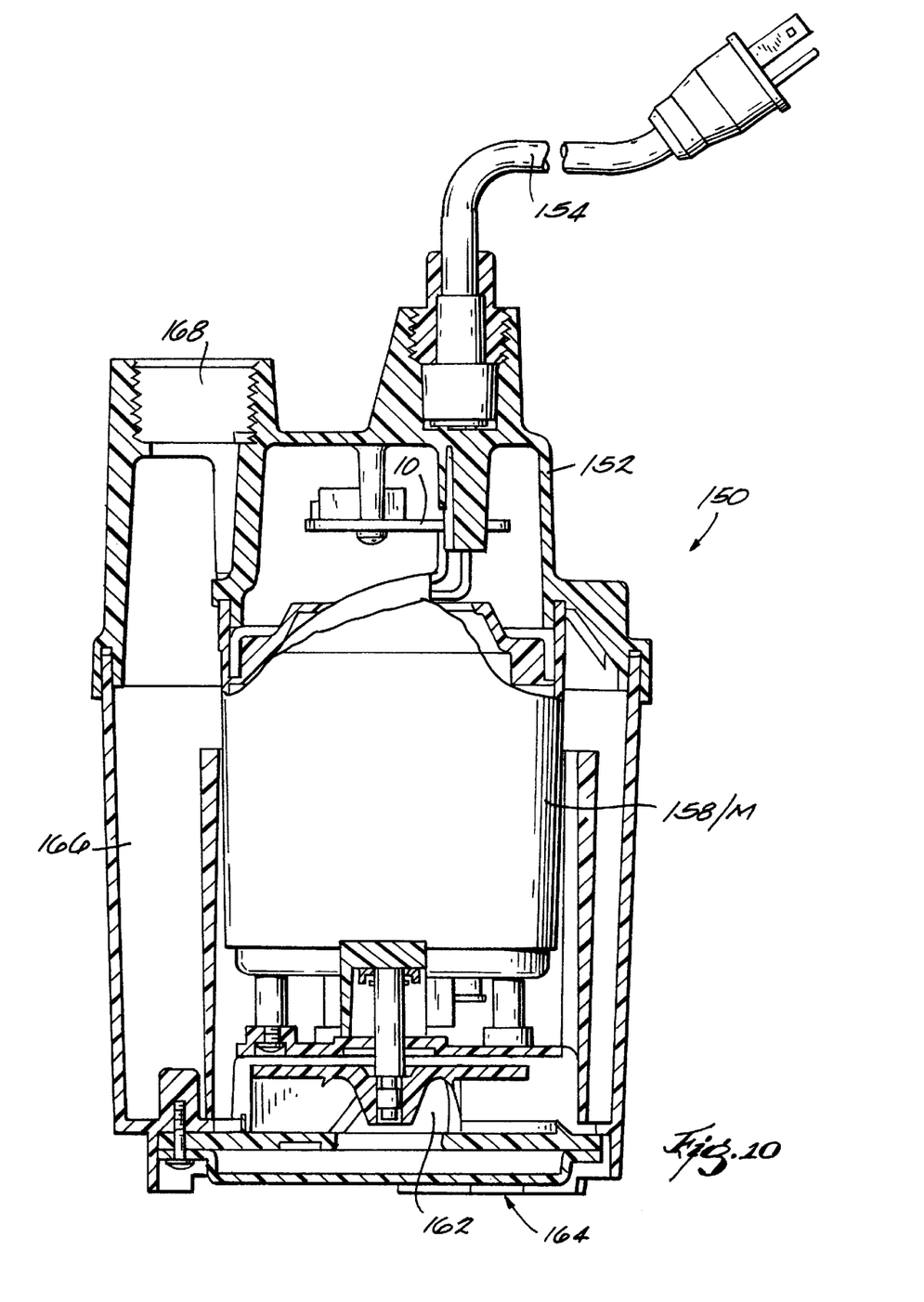
FIG. 10 is a partially cut-away view of a pump embodying the invention.

FIG. 10 illustrates a pump 150 having a housing 152 designed hold the device 10. The device 10 receives power through a power cord 154 and controls a motor 158 (equivalent to the motor M) that is also positioned within the housing 152. The motor 158 drives an impeller 162 that draws liquid through a mesh 164. The impeller 162 drives the liquid through a discharge chamber 166 and out a discharge port 168.

In many prior-art pumps, control electronics or similar controllers are positioned in a housing separate from the pump housing, in part because typical control electronics can not tolerate the heat generated by the pump motor. Further, most controllers are adversely affected by lubricants and other environmental agents that are commonly present in pump housings. In the present invention, high-temperature electronics are used and switching circuit 42 is designed to reduce heat within the housing and, as noted above, to eliminate or reduce arcing damage to the relay contacts when turning the pump on and off. As noted above, in one embodiment of the invention the switch 42 includes a triac coupled in parallel to a relay. The advantage of using both in combination is that the design takes advantage of the strengths of each type of switch and compensates for the weakness of each. A semiconductor device, such as a triac, can connect and disconnect a pump circuit without being damaged by arcing. However, the triac generates large amounts of heat, which is undesirable. On the other hand, a relay is subject to damage caused by arcing when connecting and disconnecting a circuit, but does not generate significant amounts of heat. In the invention, the relay is used to maintain the circuit, while the triac is used to connect and to disconnect the circuit. The result is a switch that can maintain operation of the pump circuit without producing excessive heat, and will not be damaged during connection and disconnection of the circuit. Further, use of the switch 42 and high-temperature electronics elsewhere, allows the module 10 to be placed in the housing 152 with the resultant benefits of a compact pump and a reduction of the number of parts due to the elimination of a separate controller housing.

As can be seen from the above, the invention provides an apparatus and method of controlling a pump using the time difference of zero-cross inputs.

Various features and advantages of the invention are set forth in the following claims.

What is claimed is:

1. A method of controlling an electric motor pump, the method comprising:

providing an AC power signal having a positive half cycle and a negative half cycle;

measuring the voltage of the AC power signal and generating a first two-state output signal that is in a logic high state when the measured voltage is on the positive half cycle and is in a logic low state when the measured voltage is on the negative half cycle;

measuring the current of the AC power signal and generating a second two-state output signal that is in a logic high state when the measured current is on the positive half cycle and is in a logic low state when the measured current is on the negative half cycle;

determining a phase difference based on a time difference between the first two-state output signal and the second two-state output signal;

comparing the phase difference to a predetermined threshold value;

opening a switch if the determined phase difference is equal to or greater than the predetermined threshold value; and closing the switch after a predetermined amount of time has elapsed.

2. A method as claimed in claim 1, further comprising waiting for a predetermined period of time prior to the act of opening a switch.

3. A method as claimed in claim 1, wherein the acts of measuring the voltage, measuring the current, determining a time difference, comparing the determined phase difference, and opening a switch are repeated after the act of closing the switch.

4. A method as claimed in claim 1, further comprising converting the AC power signal to a DC power signal.

5. A method as claimed in claim 4, further comprising providing the DC power signal to a programmable device.

6. A method as claimed in claim 1, further comprising providing the first and second two-state output signals to a programmable device.

7. A pump control apparatus comprising:
- a voltage filter capable of being coupled to an AC power source and of generating a first two-state output signal;
- a current filter capable of being coupled to an AC power source and of generating a second two-state output signal;
- a power supply circuit capable of producing a DC power signal;
- a controller coupled to the voltage filter, the current filter, and the power supply circuit and operable to produce a control signal based on the time differential between the first and second two-state output signals; and
- a switch coupled to the controller and operable to open in response to the control signal.

8. An apparatus as claimed in claim 7, wherein the switch includes a relay.

9. An apparatus as claimed in claim 8, wherein the switch includes a triac.

10. An apparatus as claimed in claim 7, wherein the voltage filter includes a zero-cross detection circuit.

11. An apparatus as claimed in claim 10, wherein the current filter includes a zero-cross detection circuit.

12. An apparatus as claimed in claim 11, wherein the controller is operable to produce the control signal when a phase difference between the first and second two-state output signals meets or exceeds a predetermined threshold.

13. An apparatus as claimed in claim 12, wherein the controller is operable to deliver the control signal to the switch after a predetermined amount of time has elapsed.

14. An apparatus as claimed in claim 12, wherein the controller is operable to produce a second control signal.

15. An apparatus as claimed in claim 14, wherein said switch is operable to close in response to said second control signal.

16. An apparatus as claimed in claim 14, wherein the controller is programmed to produce the second control signal a predetermined amount of time after producing the control signal.

17. An apparatus as claimed in claim 16, wherein the controller is a programmable device.

18. A pump comprising:
- a housing;
- a motor positioned within the housing;
- a control module positioned within the housing, the control module including
  - a voltage filter capable of being coupled to an AC power source and of generating a first two-state output signal;
  - a current filter capable of being coupled to an AC power source and of generating a second two-state output signal;
  - a power supply circuit capable of producing a DC power signal;
  - a programmable device coupled to the voltage filter, the current filter, and the power supply circuit and programmed to produce a control signal based on the time differential between the first and second two-state output signals; and
  - a switch coupled to the programmable device, operable to open in response to the control signal, and having a semiconductor device coupled in parallel to a second switching device.

19. An apparatus as claimed in claim 18, wherein the semi-conductor device is a triac.

20. An apparatus as claimed in claim 18, wherein the second switching device is a relay.

21. An apparatus as claimed in claim 20, wherein the voltage filter includes a zero-cross detection circuit.

22. An apparatus as claimed in claim 21, wherein the current filter includes a zero-cross detection circuit.

23. An apparatus as claimed in claim 22, wherein the programmable device is programmed to produce the control signal when a phase difference between the first and second two-state output signals meets or exceeds a predetermined threshold.

24. An apparatus as claimed in claim 18, wherein the programmable device is programmed to deliver the control signal to the switch after a predetermined amount of time has elapsed.

25. An apparatus as claimed in claim 18, wherein the programmable device is operable to produce a second control signal.

26. An apparatus as claimed in claim 25, wherein said switch is operable to close in response to said second control signal.

27. An apparatus as claimed in claim 25, wherein the programmable device is programmed to produce the second control signal a predetermined amount of time after producing the control signal.

28. An apparatus as claimed in claim 18, wherein the programmable device is a microcontroller.

29. A method of controlling an electric motor pump coupled to a switch, the method comprising:
- providing an AC power signal having a positive half cycle and a negative half cycle;
- measuring the voltage of the AC power signal and generating a first two-state output signal that is in a logic high state when the measured voltage is on the positive half cycle and is in a logic low state when the measured voltage is on the negative half cycle;
- measuring the current of the AC power signal and generating a second two-state output signal that is in a logic high state when the measured current is on the positive half cycle and is in a logic low state when the measured current is on the negative half cycle;
- determining a phase difference based on a time difference between the first two-state output signal and the second two-state output signal;
- comparing the phase difference to a predetermined threshold value;
- opening the switch if the determined phase difference is equal to or greater than the predetermined threshold value;
- closing the switch after a predetermined amount of time has elapsed; and
- repeating the acts of measuring the voltage, measuring the current, determining a time difference, comparing the determined phase difference, and opening a switch.

30. A pump control apparatus comprising:
- a voltage filter having a zero-cross detection circuit and capable of being coupled to an AC power source and of generating a first two-state output signal;
- a current filter having a zero-cross detection circuit and capable of being coupled to an AC power source and of generating a second two-state output signal;
- a power supply circuit capable of producing a DC power signal;
- a controller coupled to the voltage filter, the current filter, and the power supply circuit and operable to produce a control signal based on the time differential between the first and second two-state output signals; and a switch having an semiconductor device and a relay coupled in parallel circuit branches, the switch coupled to the controller and operable to open in response to the control signal.

31. An apparatus as claimed in claim 30, wherein the controller is operable to produce the control signal when a phase difference between the first and second two-state output signals meets or exceeds a predetermined threshold.

32. An apparatus as claimed in claim 31, wherein the controller is operable to deliver the control signal to the switch after a predetermined amount of time has elapsed.

33. An apparatus as claimed in claim 31, wherein the controller is operable to produce a second control signal.

34. An apparatus as claimed in claim 33, wherein said switch is operable to close in response to said second control signal.

35. An apparatus as claimed in claim 33, wherein the controller is programmed to produce the second control signal a predetermined amount of time after producing the control signal.

36. An apparatus as claimed in claim 33, wherein the controller is a programmable device.

37. A pump comprising:

a housing;

a motor positioned within the housing;

a control module positioned within the housing, the control module including a voltage filter capable of being coupled to an AC power source and of generating a first two-state output signal;

a current filter capable of being coupled to an AC power source and of generating a second two-state output signal;

a power supply circuit capable of producing a DC power signal;

a programmable device coupled to the voltage filter, the current filter, and the power supply circuit and programmed to produce a control signal based on the time differential between the first and second two-state output signals; and a switch having a low heat generating device and a high heat generating device coupled in parallel circuit branches, the switch coupled to the programmable device, and operable to open in response to the control signal.

* * * * *